(12) United States Patent  
Ishii et al.

(10) Patent No.: US 9,019,550 B2  
(45) Date of Patent: Apr. 28, 2015

(54) PRINT LABEL PRODUCING APPARATUS

(71) Applicant: Brother Kogyo Kabushiki Kaisha, Nagoya (JP)

(72) Inventors: Hidekazu Ishii, Nagoya (JP); Nako Yoshimura, Nagoya (JP); Yasunori Suzuki, Nagoya (JP); Daisuke Mifune, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 121 days.

(21) Appl. No.: 13/799,374

(22) Filed: Mar. 13, 2013

(65) Prior Publication Data

US 2013/0243509 A1  Sep. 19, 2013

(30) Foreign Application Priority Data

Mar. 19, 2012  (JP) ................... 2012-062844

(51) Int. Cl.

| | |
|---|---|
| G06K 15/00 | (2006.01) |
| G06F 3/12 | (2006.01) |
| G06K 15/02 | (2006.01) |
| B41J 3/39 | (2006.01) |
| B41J 5/34 | (2006.01) |
| B41F 17/02 | (2006.01) |
| B41J 3/407 | (2006.01) |

(52) U.S. Cl.
CPC ............ B41F 17/02 (2013.01); B41J 3/4075 (2013.01); G06F 3/1205 (2013.01); G06F 3/1257 (2013.01); G06F 3/1284 (2013.01)

(58) Field of Classification Search
USPC .......... 358/1.9, 1.13, 1.2, 1.16; 400/4, 61, 70, 400/76, 178
See application file for complete search history.

(56) References Cited

U.S. PATENT DOCUMENTS

| | | |
|---|---|---|
| 5,831,590 A | 11/1998 | Ikedo |
| 2003/0174177 A1 | 9/2003 | Tsukuda et al. |
| 2003/0219300 A1 | 11/2003 | Kurashina |
| 2005/0058485 A1 | 3/2005 | Horii et al. |

(Continued)

FOREIGN PATENT DOCUMENTS

| | | |
|---|---|---|
| JP | 07-323147 | 12/1995 |
| JP | 08-107982 | 4/1996 |

(Continued)

OTHER PUBLICATIONS

European Search Report issued in Application No. 13159461.6 on Jun. 18, 2013.

Primary Examiner — Thomas Lett  
(74) Attorney, Agent, or Firm — McCarter & English, LLP

(57) ABSTRACT

This disclosure discloses print label producing apparatus comprising a controller, a memory including a first sub memory, a second sub memory, and a third sub memory, and the controller being configured to execute a decoration setting process to perform at least one of a first sub decoration setting process for setting a decoration style randomly, a second sub decoration setting process for setting a frame randomly, and a third sub decoration setting process for setting a symbol randomly, a first print data generating process for generating first print data, by means of including at least one or more results of the decoration setting process of any of the decoration style of one or more types randomly set, the frame of one type randomly set, or the symbol of one type randomly set, and a first coordination control process for controlling the feeder and the printing head.

4 Claims, 13 Drawing Sheets

(56) References Cited

U.S. PATENT DOCUMENTS

2005/0086580 A1\* 4/2005 Horii et al. .................... 715/500
2010/0250233 A1\* 9/2010 Tanaka ............................ 704/3
2011/0255100 A1 10/2011 De Munck et al.
2011/0299908 A1 12/2011 Sugimura et al.

FOREIGN PATENT DOCUMENTS

| JP | 10-11597 | 1/1998 |
| JP | 2002-103695 | 4/2002 |
| JP | 2011-251456 | 12/2011 |

\* cited by examiner

FIG. 13
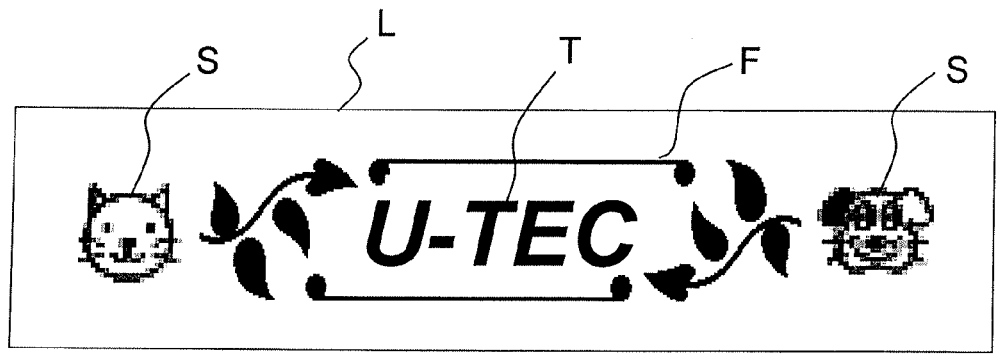
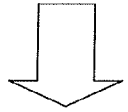
"DO YOU WANT TO PRINT THE GUIDANCE LABEL FOR PRODUCING THIS LABEL?"
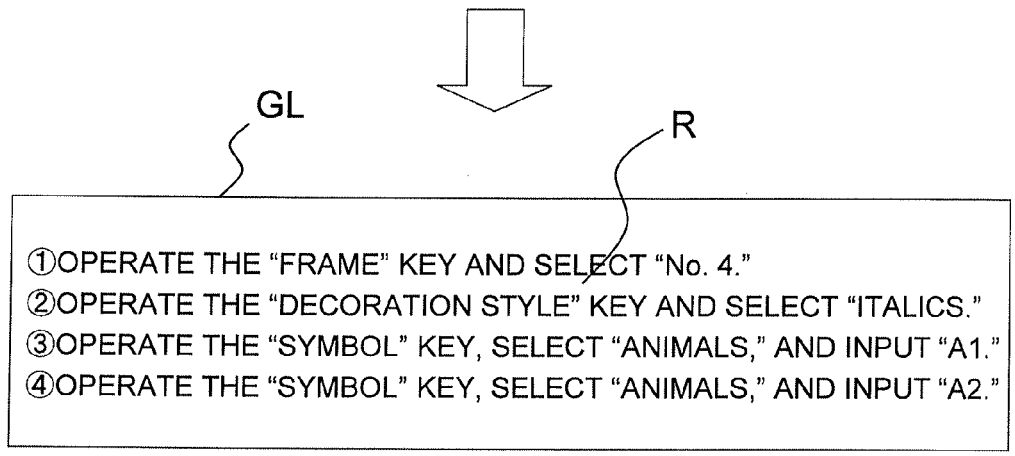

PRINT LABEL PRODUCING APPARATUS

CROSS-REFERENCE TO RELATED APPLICATION

The present application claims priority from Japanese Patent Application No. 2012-62844, which was filed on Mar. 19, 2012, the disclosure of which is incorporated herein by reference in its entirety.

BACKGROUND

Field

The present disclosure relates to a print label producing apparatus that produces print labels.

Description of the Related Art

In response to a wide variety of user needs in recent years, a wealth of functions have been incorporated in print label producing apparatuses that produce print labels. According to this prior art, it is possible, for example, for a user to produce a wide variety of print labels by inputting text characters that he or she wants to display on a print label and then adding various decorations (bold, italics, underline, shading, etc.) to the characters or label frame surrounding that text.

The prior art has the following problems. That is, in a case where a wealth of functions has been prepared for a print label producing apparatus such as previously described, these functions can be skillfully utilized as needed and a wide variety of preferred print labels can be produced by performing complex operations, if the user is a person with advanced skill. Nevertheless, for a novice user, performing such complex operations is cumbersome. As a result, even if the print label producing apparatus is provided with a wealth of functions, the user cannot utilize the functions (or does not even know that the functions exist), making it difficult for him or her to quickly and easily produce and enjoy producing a decorated print label.

SUMMARY

It is therefore an object of the present disclosure to provide a print label producing apparatus that permits even a novice user to quickly and easily produce and enjoy producing a decorated print label.

In order to achieve the above-described object, according to the first aspect of the present application, there is provided a print label producing apparatus comprising a feeder configured to feed a print-receiving medium, a printing head configured to form print on the print-receiving medium fed by the feeder, a first operating device configured to input for an operation text characters to be printed on a print label produced by use of the print-receiving medium, a second operating device configured to issue a production start instruction for the print label, a memory, and a controller, the memory including a first sub memory configured to store decoration styles of a plurality of types prepared in advance for application to the text characters to be formed on the print label, a second sub memory configured to store frames of a plurality of types prepared in advance for surrounding the text characters on the print label, and a third sub memory configured to store symbols of a plurality of types prepared in advance for formation along with the text characters on the print label, the symbols being classified according to a plurality of categories predetermined in relation to the print label, and the controller being configured to execute a decoration setting process to perform at least one of a first sub decoration setting process for setting a decoration style of one or more types randomly among the decoration styles of a plurality of types stored in the first sub memory, a second sub decoration setting process for setting a frame of one type randomly among the frames of a plurality of types stored in the second sub memory, and a third sub decoration setting process for setting a symbol of one type randomly among symbols of a plurality of types stored in the third sub memory, the symbols being corresponding to the one category specified from the plurality of categories based on the text characters input via the first operating device, a first print data generating process for generating first print data, by means of including at least one or more results of the decoration setting process of any of the decoration style of one or more types randomly set by the first sub decoration setting process, the frame of one type randomly set by the second sub decoration setting process, or the symbol of one type randomly set by the third sub decoration setting process, in a case that the second operating device is operated, and a first coordination control process for controlling the feeder and the printing head in coordination and for producing the print label with formed print corresponding to the first print data.

In the print label producing apparatus according to the first aspect, when producing a print label that expresses preferred text characters intended by an operator, it is possible to set various decoration styles of the text characters, frames surrounding the text characters, and symbols additionally formed along with the text characters as decorations for text characters. That is, the first sub memory stores the decoration styles of a plurality of types, and the second sub memory stores the frames of a plurality of types. Further, third sub memory categorizes the symbols of a plurality of types into a plurality of categories set in advance.

Then, when the operator issues a production start instruction for the print label using the second operating device after inputting the text characters using the first operating device, at least one of the following is executed: the first decoration setting process randomly sets a decoration style of one or more types from the plurality of types, the second decoration setting process randomly sets a frame of one type from the plurality of types, and third decoration setting process randomly sets a symbol of one type from the plurality of types. Note that the third decoration setting process randomly sets a symbol of one type corresponding to one specific category associated by a specific correlation set in advance, for example, based on the input text characters (or one category selected by the operator using third operating device). Then, the control of first coordination control process produces a corresponding print label based on first print data generated by first print data generating process, using the set decoration styles of one or more types, frame, symbol, etc.

As a result of the above, the operator can quickly and easily produce a print label decorated with a decoration style, frame, and symbol by simply performing a text character input operation and a production start instruction operation (or by simply further adding a category selection operation). Accordingly, it is possible for even a novice user who at present has only performed the above text character input operation and production start instruction operation, for example, to enjoy decorating a print label as described above. As a result, it is possible to make the novice user aware that the print label producing apparatus comprises the decoration adding function, and spark his or her interest in the adding of decorations. Further, the decoration styles, frames, and symbols of one or more types combinable as previously described are respectively selected at random from the plurality of types, thereby producing print labels of different print forms each time the operator performs the above operations. With this as well, it is possible to further spark the interest of the novice user in the adding of decorations.

In order to achieve the above-described object, according to the second aspect of the present application, there is provided a print label producing apparatus comprising a feeder configured to feed a print-receiving medium, a printing head configured to form print on the print-receiving medium fed by the feeder, a first operating device configured to input for an operation text characters to be printed on a print label produced by use of the print-receiving medium, a second operating device configured to issue a production start instruction for the print label, a memory, and a controller, the memory including a first sub memory configured to store decoration styles of a plurality of types prepared in advance for application to the text characters to be formed on the print label, a second sub memory configured to store frames of a plurality of types prepared in advance for surrounding the text characters on the print label, and a fourth sub memory configured to store symbols of a plurality of types prepared in advance for formation along with the text characters on the print label, and the controller being configured to execute a decoration setting process to perform at least one of a first sub decoration setting process for setting a decoration style of one or more types randomly among the decoration styles of a plurality of types stored in the first sub memory, a second sub decoration setting process for setting a frame of one type randomly among the frames of a plurality of types stored in the second sub memory, and a fourth sub decoration setting process for setting a symbol of one type randomly among the symbols of a plurality of types stored in the fourth sub memory, a second print data generating process for generating second print data, by means of including at least one or more results of the decoration setting process of any of the decoration style of one or more types randomly set by the first sub decoration setting process, the frame of one type randomly set by the second sub decoration setting process, or the symbol of one type randomly set by the fourth sub decoration setting process, in case that the second operating device is operated, and a third coordination control process for controlling the feeder and the printing head in coordination and for producing the print label with formed print corresponding to the second print data.

In the print label producing apparatus according to the second aspect, when producing a print label that expresses preferred text characters intended by an operator, it is possible to set various decoration styles of the text characters, frames surrounding the text characters, and symbols additionally formed along with the text characters as decorations for text characters. That is, first sub memory stores the decoration styles of a plurality of types, second sub memory stores the frames of a plurality of types, and fourth sub memory stores the symbols of a plurality of types. Then, when the operator issues a production start instruction for the print label using the second operating device after inputting the text characters using the first operating device, at least one of the following is executed: first decoration setting process randomly sets a decoration style of one or more types from the plurality of types, second decoration setting process randomly sets a frame of one type from the plurality of types, and fourth decoration setting process randomly sets a symbol of one type from the plurality of types. Then, the control of third coordination control process produces a corresponding print label based on second print data generated by second print data generating process, using the set decoration style of one or more types, frame, symbol, etc.

As a result of the above, the operator can quickly and easily produce a print label decorated with a decoration style, frame, and symbol by simply performing a text character input operation and a production start instruction operation. Accordingly, it is possible for even a novice user who at present has only performed the above two operations, for example, to enjoy decorating a print label as described above. As a result, it is possible to make the novice user aware that the print label producing apparatus comprises the decoration adding function, and spark his or her interest in the adding of decorations. Further, the decoration styles, frames, and symbols of one or more types combinable as previously described are respectively selected at random from the plurality of types, thereby producing print labels of different print forms each time the operator performs the above operations. With this as well, it is possible to further spark the interest of the novice user in the adding of decorations.

In order to achieve the above-described object, according to the third aspect of the present application, there is provided a print label producing apparatus comprising a feeder configured to feed a print-receiving medium, a printing head configured to form print on the print-receiving medium fed by the feeder, a first operating device configured to input for an operation text characters to be printed on a print label produced by use of the print-receiving medium, a second operating device configured to issue a production start instruction for the print label, a third operating device for inputting for selection one category of a plurality of categories predetermined in relation to the print label, a memory configured to store a plurality of combinations made of a specific decoration style prepared in advance for application to the text characters to be formed on the print label, a specific frame of one type prepared in advance for surrounding the text characters on the print label, and a specific symbol of one type prepared in advance for formation along with the text characters on the print label, respectively and individually associated with the plurality of categories, and a controller, and the controller being configured to execute a decoration setting process for setting one combination corresponding to one the category selected by the third operating device among the plurality of combinations stored in the memory, a third print data generating process for combining the specific decoration style, the specific frame of one type, and the specific symbol of one type, in accordance with one combination set by the decoration setting process, and generating third print data, in case that the second operating device is operated, and a fifth coordination control process for controlling the feeder and the printing head in coordination and for producing the print label with formed print corresponding to the third print data.

In the print label producing apparatus according to the third aspect, when producing a print label that expresses preferred text characters intended by an operator, it is possible to set various decoration styles of text characters, frames surrounding text characters, and symbols additionally formed along with text characters as decorations for text characters. At that time, the decoration styles of a plurality of types, the frames of a plurality of types, and the symbols of a plurality of types are prepared, and a plurality of combinations made of specific decoration styles, a specific frame of one type, and a specific symbol of one type thereof is set in advance. Then, these combinations are respectively associated with a plurality of preset categories and stored in memory.

The operator inputs the text characters using the first operating device, selects and inputs the category using the third operating device, and then issues a production start instruction for the print label using the second operating device. Then, the decoration setting process sets one combination corresponding to the category selected and input from the plurality of combinations. Then, the control of fifth coordination control process produces a corresponding print label based on third print data generated by third print data generating process, using the specific decoration styles, specific frame, and specific symbol corresponding to the set combination.

As a result of the above, the operator can quickly and easily produce a print label decorated with a decoration style, frame, and symbol by simply performing a text character input operation, a category selection operation, and a production start instruction operation. Accordingly, it is possible for even a novice user who at present has only performed the above text character input operation and production start instruction operation, for example, to enjoy decorating a print label as described above. As a result, it is possible to make the novice user aware that the print label producing apparatus comprises the decoration adding function, and spark his or her interest in the adding of decorations. Further, each combination of decoration styles, a frame, and a symbol combined as previously described is associated with a category, resulting in production of a print label of a different print form when the operator selects a different category. With this as well, it is possible to further spark the interest of the novice user in the adding of decorations.

BRIEF DESCRIPTION OF THE DRAWINGS

FIG. 13 is an explanatory view showing an example in which a guidance label of a label production method is produced in the fourth embodiment of the present disclosure.

DETAILED DESCRIPTION OF THE PREFERRED EMBODIMENTS

The following describes the embodiments of the present disclosure with reference to accompanying drawings.

First Embodiment

First, a first embodiment of the present disclosure will be described with reference to FIGS. 1-6. A print label producing apparatus 1 of this embodiment produces a print label L as a printed object by cutting a label tape with print on which preferred printing was performed at a predetermined length. The general configuration of this print label producing apparatus 1 will now be described with reference to FIG. 1. In this embodiment, the terms front, rear, left, right, up, and down of the print label producing apparatus 1 indicate the directions shown in FIG. 1, FIG. 2, etc.

General Overall Configuration

Figure 1:
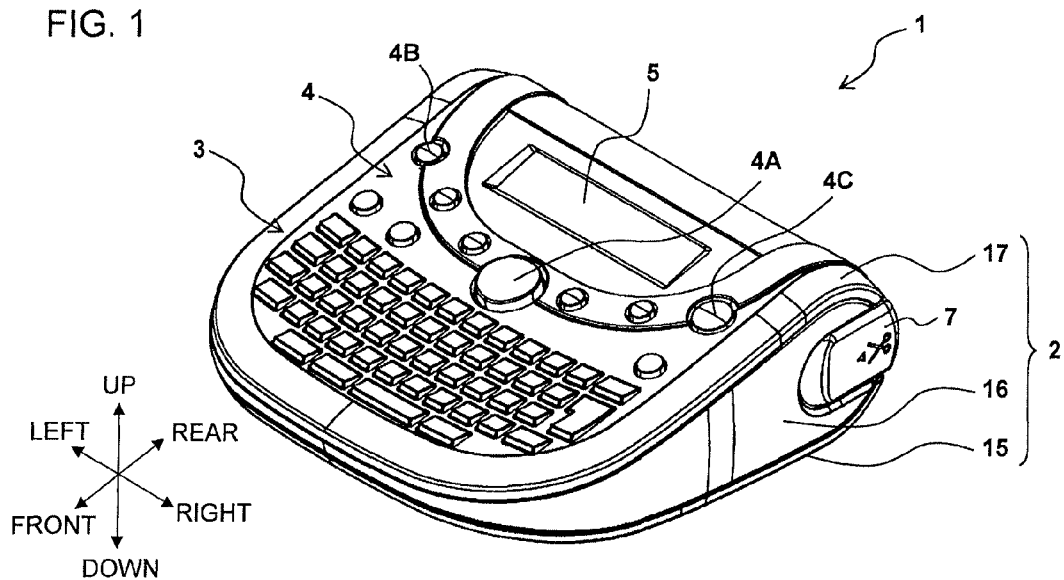
FIG. 1 is a perspective view showing the outer appearance of the print label producing apparatus according to the first embodiment of the present disclosure, as viewed obliquely from above.
Figure 2:
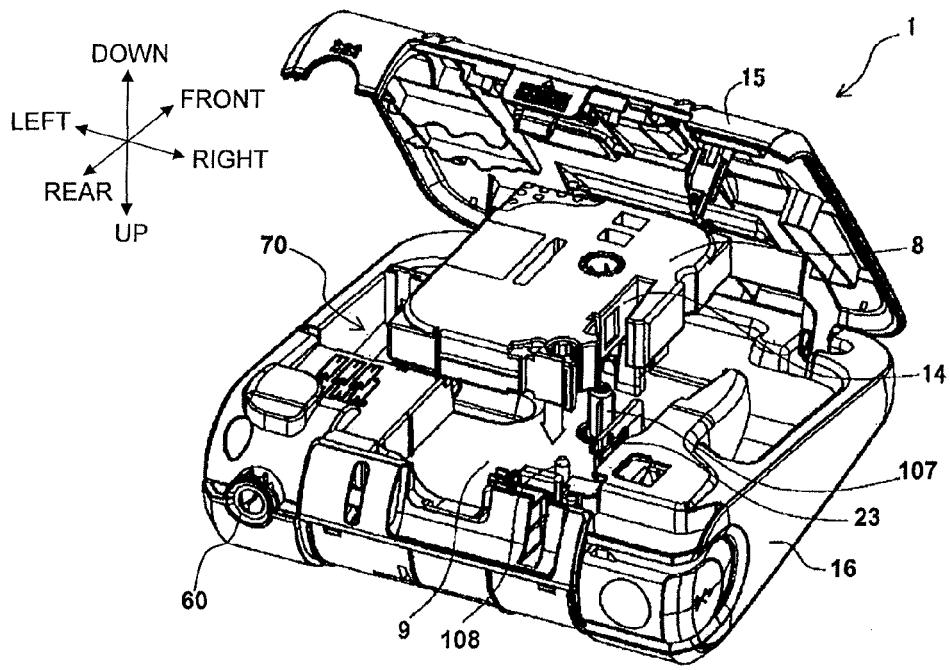
FIG. 2 is a perspective view showing the outer appearance of the print label producing apparatus with the lower cover open, as viewed obliquely from below.

As shown in FIG. 1 and FIG. 2, a housing 2 of the print label producing apparatus 1 comprises a lower cover 15 constituting the apparatus lower surface, a side cover 16 constituting the apparatus side surface, and an upper cover 17 constituting the apparatus upper surface. The upper cover 17 is provided with a keyboard 3 by which various operations, such as character input, etc., are performed, a function key group 4 for executing various functions of the print label producing apparatus 1, and a liquid crystal display 5 for displaying input characters, symbols, and the like, in that order from the front toward the rear. The function key group 4, in this example, includes a dresser key 4A, a power switch 4B, a printer key 4C, etc. Further, a cutter lever 7 for cutting a print label tape 109 with print (refer to FIG. 3) is provided rearward from and on the right side of the side cover 16.

A cartridge holder 9 capable of attaching and detaching a cartridge 8 is provided rearward from and on the lower side of the print label producing apparatus 1. This cartridge holder 9 is covered when the above described lower cover 15 configured in an openable and closeable manner with the front end of the print label producing apparatus 1 serving as the axis of rotation is closed, and is exposed when the lower cover 15 is opened.

Further, as shown in FIG. 2, a battery storage part 70 capable of storing a plurality of batteries BT (refer to FIG. 4 described later) is provided adjacent to the cartridge holder 9, rearward from and on the lower side of the print label producing apparatus 1. Further, in FIG. 2, reference numeral 60 denotes a DC jack to which the output plug of an AC adapter 220 (refer to FIG. 4 described later) serving as an external power source is connected.

Cartridge

Figure 3:
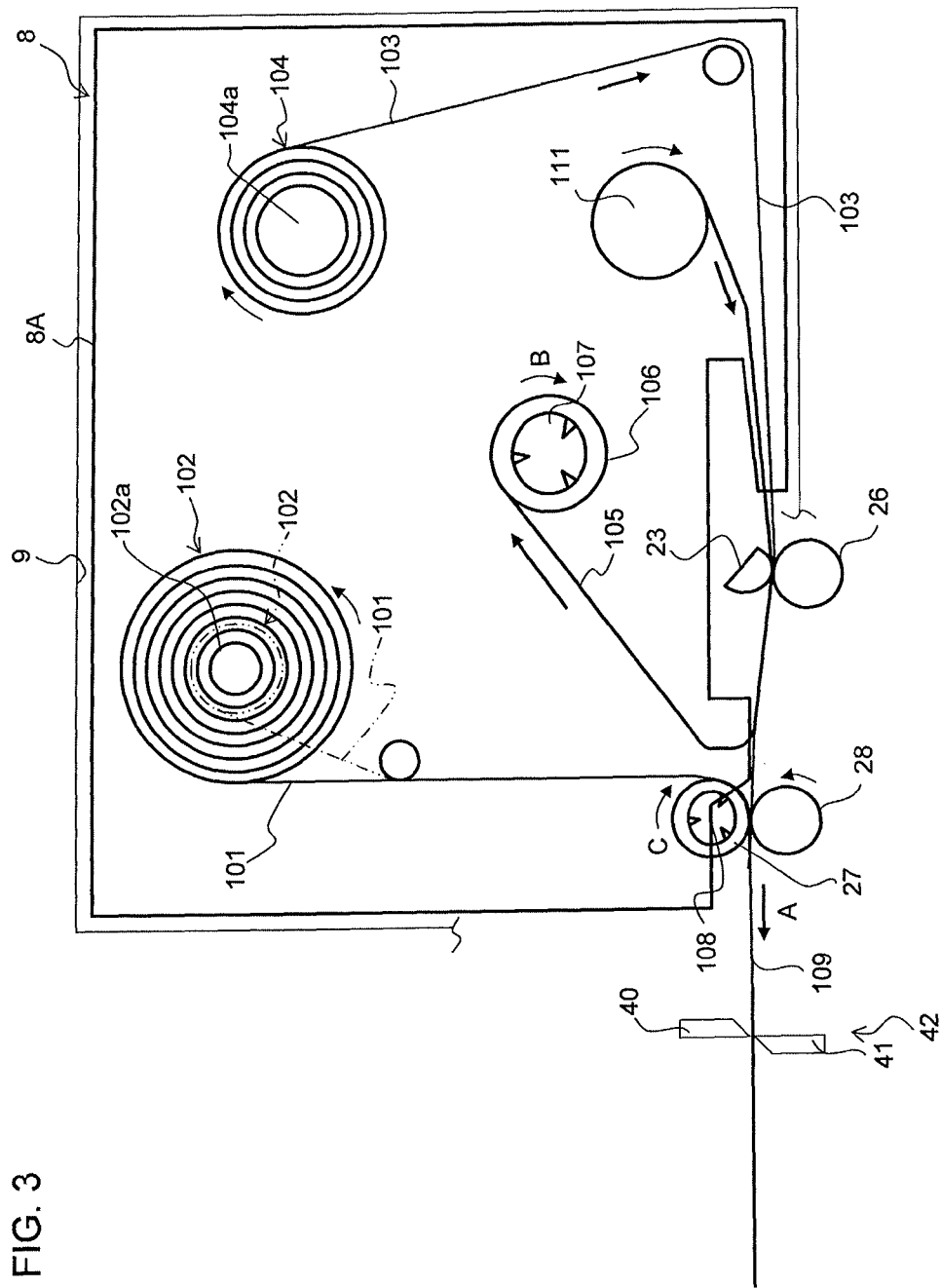
FIG. 3 is an enlarged plan view schematically showing the inner structure of a cartridge.

As shown in FIG. 3, the cartridge 8 comprises a housing 8A, a first roll 102 (actually spiral in shape, but simply shown in a concentric shape in the figure), around which a strip base tape 101 is wound, and which is disposed within the housing 8A, a second roll 104 (actually spiral in shape, but simply shown in a concentric shape in the figure), around which a transparent cover film 103 constituting a print-receiving object in this embodiment is wound, with approximately the same width as that of the above described base tape 101, a ribbon supply side roll 111 configured to feed out an ink ribbon 105 (heat transfer ribbon, which is not required in a case of employing a thermal tape as the print-receiving tape), a ribbon take-up roller 106 configured to rewind the ribbon 105 after the printing, and a feeding roller 27 rotatably supported near a tape discharging part of the cartridge 8.

The feeding roller 27 is configured to adhere the above described base tape 101 and the above described cover film 103 to each other by applying pressure and feed the above described label tape 109 with print thus formed in the direction of the arrow A in FIG. 3 (functioning as a pressure roller as well).

The first roll 102 has the above described base tape 101 wound around a reel member 102a. Although not shown in detail, the base tape 101, in this example, has a four-layer structure comprising a bonding adhesive layer made of a suitable adhesive, a colored base film made of PET (polyethylene terephthalate) or the like, a bonding adhesive layer made of a suitable adhesive, and a separation sheet, which are layered in that order from the side rolled to the inside to the opposite side.

The second roll 104 has the above described cover film 103 wound around a reel member 104a. On the rear surface of the cover film 103 fed out from the second roll 104, the ink ribbon 105 is pressed against and made to contact a thermal head 23.

At this time, in accordance with the configuration of the above-described cartridge 8, the cartridge holder 9 is provided with a ribbon take-up roller driving shaft 107 for rewinding the above described used ink ribbon 105, and a feeding roller driving shaft 108 for driving the above described feeding roller 27 for feeding the label tape 109 with print. Further, the above described thermal head 23 that performs preferred printing on the cover film 103 is provided to the cartridge holder 9 so that it is positioned at an above described opening 14 thereof when the cartridge 8 is mounted.

The ribbon take-up roller 106 and the feeding roller 27 are respectively rotationally driven in coordination by the driving force of a drive motor 211 (refer to FIG. 4 described later), which is a pulse motor, for example, provided on the outside of the cartridge 7, that is transmitted to the above described ribbon take-up roller driving shaft 107 and the above described feeding roller driving shaft 108 via a gear mechanism (not shown).

In the above described configuration, when the cartridge 7 is mounted to the above described cartridge holder 6 and the roll holder is moved from a release position (not shown) to a printing position shown in FIG. 3, the cover film 103 and the ink ribbon 105 are held between the above described thermal head 23 and the platen roller 26 provided facing this thermal head 23. With this, the base tape 101 and the cover film 103 are held between the feeding roller 27 and a pressure roller 28 provided facing the feeding roller 27. Then, the ribbon take-up roller 106 and the feeding roller 27 are synchronously rotationally driven along the directions denoted by arrow B and arrow C, respectively, in FIG. 3 by the driving force of the above described drive motor. Furthermore, the aforementioned feeding roller driving shaft 108, the above described pressure roller 28, and the platen roller 26 are connected to one another by a gear mechanism (not shown). With such an arrangement, with the driving of the feeding roller driving shaft 108, the feeding roller 27, the pressure roller 28, and the platen roller 26 rotate, thereby feeding out and supplying the base tape 101 from the first roll 102 to the feeding roller 27 as previously described.

On the other hand, the cover film 103 is fed out from the second roll 104, and a plurality of heating elements provided to the thermal head 23 is energized to generate heat by a thermal head control circuit 217 (refer to FIG. 4 described later). At this time, on the rear surface side of the cover film 103 (that is, the side to be adhered with the above described base tape), the ink ribbon 105 driven by the ribbon take-up roller 106 is pressed and made to contact the above described thermal head 23. As a result, print (details described later) corresponding to print data of preferred print contents is printed on the rear surface of the cover film 103.

Then, the above described base tape 101 and the cover film 103 on which the above described printing is completed are adhered and integrated by the above described bonding adhesive layer by the pressing of the above described feeding roller 27 and the pressure roller 28 so as to form a single tape, thereby forming the label tape 109 with print, which is then discharged to outside the cartridge 8. The ribbon take-up roller driving shaft 107 is then driven to rewind the ink ribbon 105, which has been used to print the print on the cover film 103, onto the ribbon take-up roller 106.

A cutting mechanism 42 comprising a fixed blade 40 and a moveable blade 41 is provided to the downstream side of the transport path of the label tape 109 with print discharged to the outside of the cartridge 8. The movable blade 41 operates when the above described cutter lever 7 is operated, cutting the above described label tape 109 with print, thereby generating the print label L (refer to FIG. 5, etc.).

Control System

Next, the control system of the print label producing apparatus 1 will now be described with reference to FIG. 4.

Figure 4:
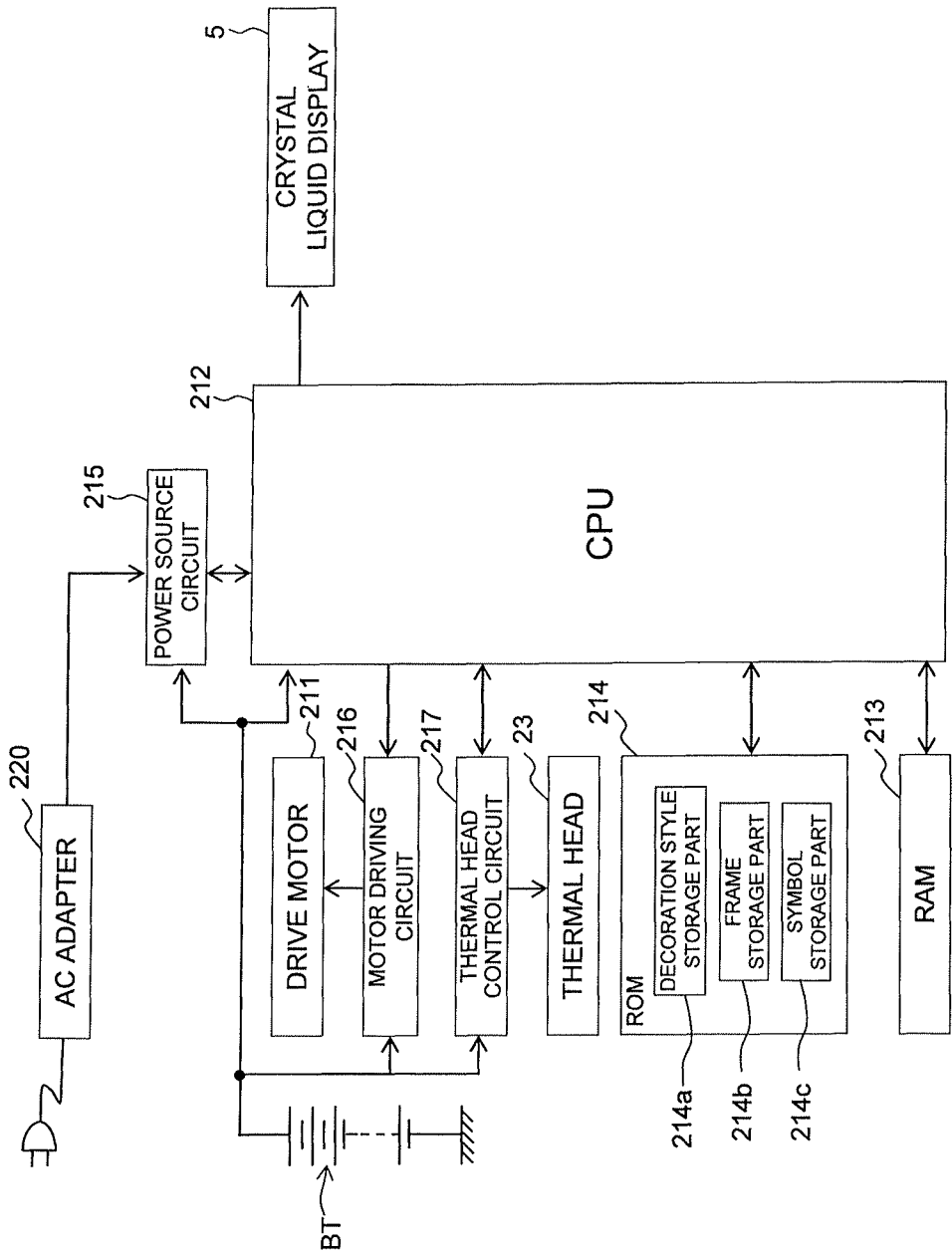
FIG. 4 is a functional block diagram showing the control system of the print label producing apparatus.

In FIG. 4, the print label producing apparatus 1 has a CPU 212 constituting a computing part that performs predetermined computations.

The above described liquid crystal display 5, a ROM 214, and a RAM 213 are connected to the CPU 212. Further, the CPU 212 is connected with a power source circuit 215 that is connected to the AC adapter 220 and performs the ON/OFF processing of the power source of the print label producing apparatus 1, a motor driving circuit 216 that controls the drive of the drive motor 211 that drives the above described platen roller 26, and the thermal head control circuit 217 configured to control the energization of the heating elements of the above described thermal head 23.

The ROM 214 is provided with a decoration style storage part 214a, a frame storage part 214b, and a symbol storage part 214c described later. The details of the stored contents of these storage parts will be described later. The ROM 214 also stores various control programs. Further, the RAM 213 temporarily stores (saves) the contents of the decoration style of text characters T, a frame F, and a symbol S (details described later) set from the above described decoration style storage part 214a, frame storage part 214b, and symbol storage part 214c, respectively.

Then, the CPU 212 performs signal processing in accordance with a program stored in advance in the ROM 214 while utilizing the temporary storage function of the RAM 213, and controls the entire print label producing apparatus 1 accordingly.

Special Characteristics of this Embodiment

In the above basic configuration, the special characteristics of this embodiment lie in the fact that the operator can quickly and easily produce a suitably decorated print label L without performing operations that are complex and cumbersome for a novice user by simply performing a text character input operation via the function key group 4 and a production start instruction operation (details described later) via the dresser key 4A, etc.

Figure 5:
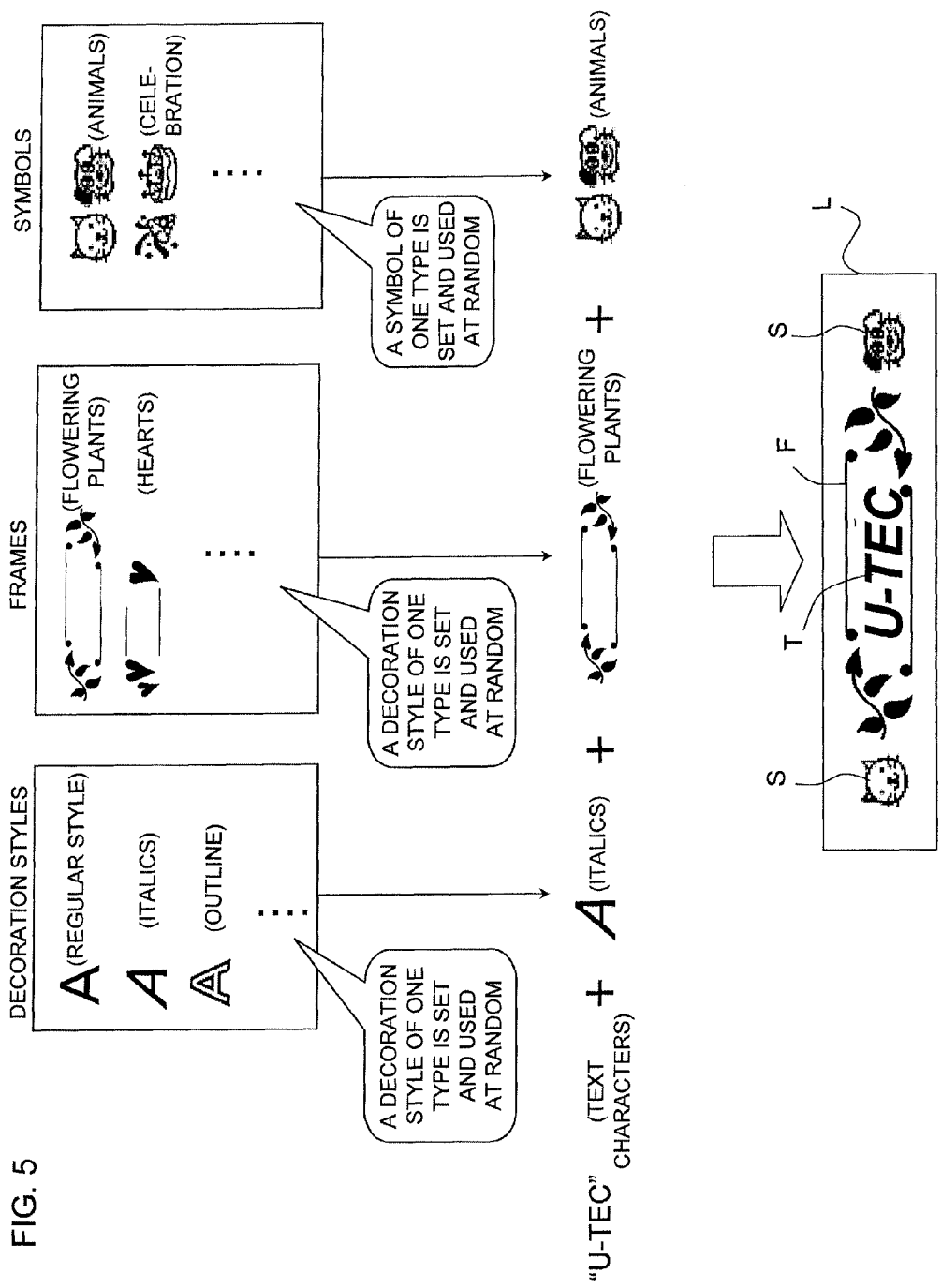
FIG. 5 is an explanatory view explaining an example of the random setting of a decoration style, frame, and symbol when producing a single print label.

That is, as shown in FIG. 5, in the print label producing apparatus 1 of this embodiment, when producing the print label L that expresses the preferred text characters T intended by the operator, it is possible to set various decoration styles of the text characters T, the frame F surrounding the text characters T, and symbol S additionally formed along with the text characters T as decorations for the text characters T. That is, the above described decoration style storage part 214a of the aforementioned ROM 214 stores the above described decoration styles of a plurality of types pertaining to the text characters T prepared in advance, the above described frame storage part 214b stores the frame F of a plurality of types prepared in advance, and the above described symbol storage part 214c stores the symbols S of a plurality of types prepared in advance.

For example, when the operator, as shown in FIG. 5, inputs the text characters T "U-TEC," for example, using the above described keyboard 3 and then issues the production start instruction for the print label L using the above described dresser key 4A, first a decoration style of one or more types (one type in this example) is set at random from the decoration styles of a plurality of types stored in the decoration style storage part 214a. In the example of FIG. 5, from the prepared "Regular style," "Italics style," "Outline style," and other types, the "Italics style" is set. Further, from the frames F of a plurality of types stored in the frame storage part 214b, the frame F of one type is set at random. In the example of FIG. 5, from the prepared "Flowering plants," "Hearts," and other types, the frame F of the "Flowering plants" is set. Furthermore, from the symbols S of a plurality of types stored in the symbol storage part 214c, the symbol S of one type is set at random. In the example of FIG. 5, from "Animals" made of the faces of a dog and cat, "Celebration" made of crackers and a cake, and other types prepared, the symbol S of "Animals" is set.

Then, the text characters T of the above described set decoration style, the frame F of the set type, and the symbol S of the set type (that is, two symbols S) are used to generate the print data (details described later; refer to step S60 of FIG. 6 described later). Then, based on that print data, the feeding roller driving shaft 108 and the thermal head 23 are controlled in coordination, thereby producing the corresponding print label L. In the example of FIG. 5, the print label L with the frame F of the above described flowering plants surrounding the outer periphery of the text "U-TEC" at the center, and the symbols S and S of the faces of the dog and cat disposed on both the left and right ends of the frame F of the flowering plants is produced.

Control Procedure

Figure 6:
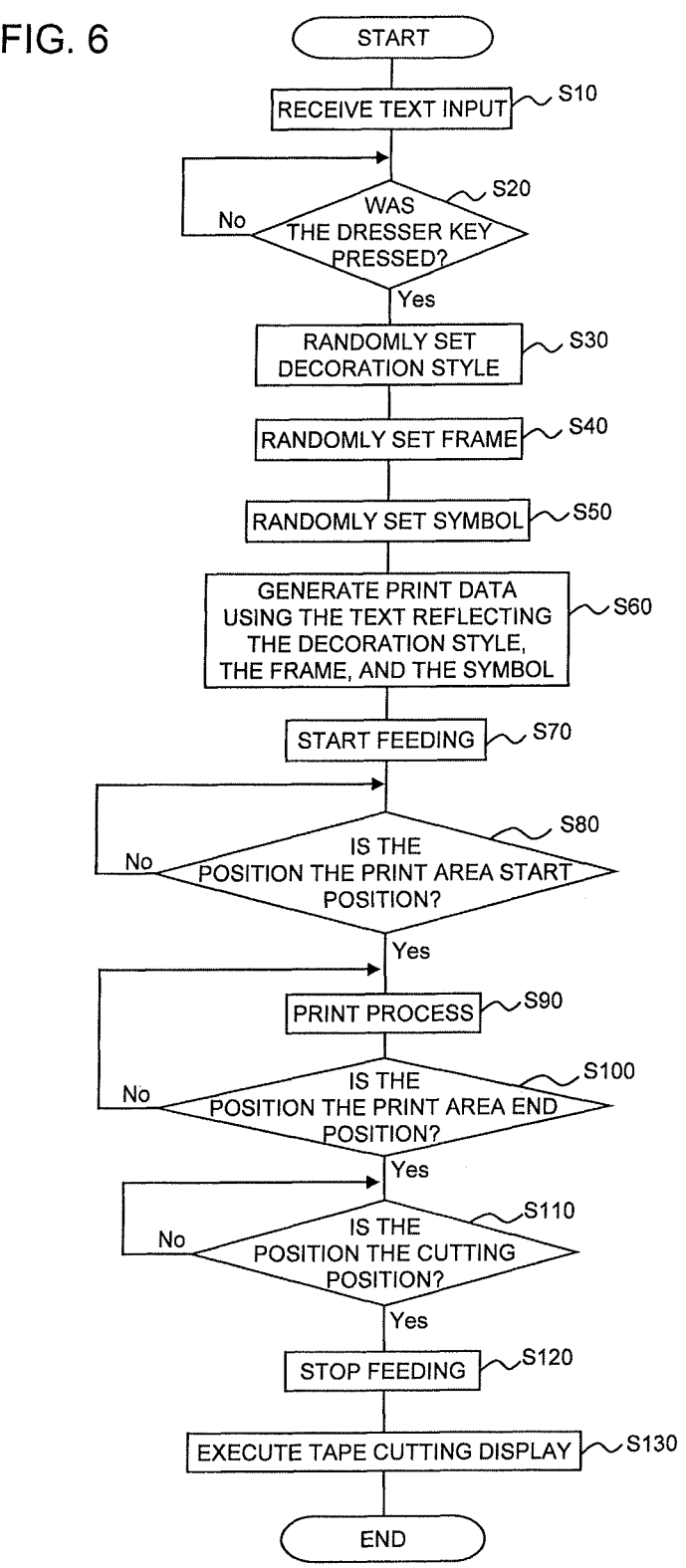
FIG. 6 is a flowchart showing a control procedure executed by the CPU.

FIG. 6 shows the processing procedure executed by the CPU 212 in order to achieve the technique of this embodiment described above.

In FIG. 6, the operator, for example, operates the power switch 4B of the above described function key group 4, thereby starting this flow.

First, in step S10, the CPU 212 receives input of the text characters T (characters, symbols, etc.) that the operator input by suitably operating the keyboard 3 and wants printed on the print label L.

In step S20, the CPU 212 determines whether or not a production start instruction for the print label L was issued by the pressing of the dresser key 4A. If the dresser key 4A has not been pressed, the decision is made that the condition of step S20 is not satisfied (S20: No), and the flow loops and enters a standby state until the condition of step S20 is satisfied. In a case where the dresser key 4A was pressed, the decision is made that the condition of step S20 is satisfied (S20: Yes), and the flow proceeds to step S30.

Note that, unlike the above described steps S10 and S20, the flow may proceed to steps S30 and thereafter when the dresser key 4A is first pressed by the operator, the input of the above described text characters T is received via a suitable operation such as that of the keyboard 3, etc., and the print key 4C is subsequently operated as a production start instruction for the print label L.

In step S30, the CPU 212 sets at random one type of decoration style from the plurality of types stored in the above described decoration style storage part 214a of the ROM 214 as the decoration style that is to be applied to the text characters T input in the above described step S10.

Subsequently, in step S40, the CPU 212 sets at random one type of the frame F from the plurality of types stored in the above described frame storage part 214b of the ROM 214 as the frame F to surround the text characters T input in the above described step S10.

Then, in step S50, the CPU 212 sets at random one type of the symbol S from the plurality of types stored in the above described symbol storage part 214c of the ROM 214 as the symbol to be disposed on both the left and right sides of the frame F set in the above described step S40.

In step S60, the CPU 212 produces the print data using the text characters T reflecting the decoration style set in the above described step S30, the frame F set in the above described step S40, and the symbol S set in the above described step S50. Note that generation of the print data is not always limited to use of all three described above, allowing generation using at least one of the text characters T reflecting the decoration style set in the above described step S30, the frame F set in the above described step S40, and the symbol S set in the above described step S50.

Subsequently, in step S70, the CPU 212 outputs a control signal to the motor driving circuit 216, causing the drive motor 211 to start the driving of the feeding roller driving shaft 108 and the ribbon take-up roller driving shaft 107. As a result, the feeding of the cover film 103, the base tape 101, and the label tape 109 with print (hereinafter suitably and simply "the cover film 103, etc.") is started.

Then, in step S80, the CPU 212 determines whether or not the fed cover film 103, etc., was fed up to a predetermined start position of a print area (whether or not the cover film 103, etc., was fed up to a transport direction position where the print head 23 directly faces the front end of a print area) as described above. This determination may be made by simply using a suitable known technique, such as counting the number of pulses of the above described drive motor 211 comprising a stepping motor, for example. If the cover film 103, etc., is not fed up to the start position of the print area, the decision is made that the condition of step S80 is not satisfied (S80: No), and the flow loops and enters a standby state until the condition of step S80 is satisfied. Once the cover film 103, etc., is fed up to the start position of the print area, the decision is made that the condition of step S80 is satisfied (S80: Yes), and the flow proceeds to step S90.

In step S90, the CPU 212 performs print processing that energizes the heating elements of the thermal head 23 based on the print data generated in step S60. With this arrangement, the ink of the ink ribbon 105 is transferred by the above described energized heating elements and the print corresponding to the above described print data is formed on the cover film 103.

Subsequently, in step S100, the CPU 212 determines whether or not the fed cover film 103, etc., was fed up to an end position of the print area (whether or not the cover film 103, etc., was fed up to a transport direction position where the print head 23 directly faces the rear end of the print area). This determination may also be made by simply using a known technique similar to the above. If the cover film 103, etc., is not fed up to the end position of the print area, the decision is made that the condition of step S100 is not satisfied (S100: No), the flow returns to step S90, and the same procedure is repeated. Once the cover film 103, etc., is fed up to the end position of the print area, the decision is made that the condition of step S100 is satisfied (S100: Yes), and the flow proceeds to step S110.

In step S110, the CPU 212 determines whether or not the fed cover film 103, etc., was fed up to the predetermined cutting position set on the label rear end side from the print area based on the above described print data (whether or not the label tape 109 with print was fed up to the transport direction position where the above described movable blade 41 directly faces the above described cutting position). This determination may also be made by simply using a known technique similar to the above. If the cover film 103, etc., is not fed up to the cutting position, the decision is made that the condition of step S110 is not satisfied (5110: No), and the flow loops and enters a standby state until the condition of step S110 is satisfied. Once the cover film 103, etc., is fed up to the cutting position, the decision is made that the condition of step S110 is satisfied (5110: Yes), and flow proceeds to step S120.

In step S120, the CPU 212 outputs a control signal to the motor driving circuit 216, causing the drive motor 211 to stop the driving of the feeding roller driving shaft 108 and the ribbon take-up roller driving shaft 107. As a result, the feeding of the cover film 103, the base tape 101, and the label tape 109 with print stops.

Subsequently, in step S130, the CPU 212 outputs a display signal to the liquid crystal display 5. With this arrangement, a suitable display that prompts the operator to operate the cutter lever 7, activate the cutting mechanism 15, and cut the label tape 109 with print is executed. When the operator operates the cutter lever 7, the label tape 109 with print is cut, thereby generating the print label L such as the example shown in FIG. 5 in which the frame F set in the above described step S40 surrounds the periphery of the text characters T reflecting the decoration style set in the above described step S30, and the symbols S and S set in the above described step S50 are further respectively disposed on both label ends. This process then terminates here.

As described above, according to this embodiment, the operator can quickly and easily produce the print label L decorated with the decoration style of the text characters T, the frame F, and the symbol S by simply performing the input operation of the text characters T using the keyboard 3 and the production start instruction operation using the dresser key 4A (or the print key 4C). Accordingly, it is possible for even a novice user who at present has only performed the above two operations (the text input operation and the production start operation), for example, to enjoy decorating the print label L as described above. As a result, it is possible to make the novice user aware that the print label producing apparatus 1 is provided with a decoration adding function (the adding of the decoration style, the frame F, and the symbol S) such as previously described, and spark the interest of the novice user in the adding of decorations.

Further, the decoration styles, the frames F, and the symbols S combinable as previously described are respectively selected at random from the plurality of types (refer to steps S30, S40, and S50), thereby producing the print label L of different print forms each time the operator performs the above described operations. With this as well, it is possible to further spark the interest of the novice user in the above described adding of decorations.

Second Embodiment

Next, a second embodiment of the present disclosure will be described with reference to FIGS. 7-9. Note that components identical to those in the first embodiment are denoted using the same reference numerals, and descriptions thereof will be omitted or simplified as appropriate. According to this embodiment, the symbols S of the plurality of types are each separated and stored according to a plurality of categories.

Figure 7:
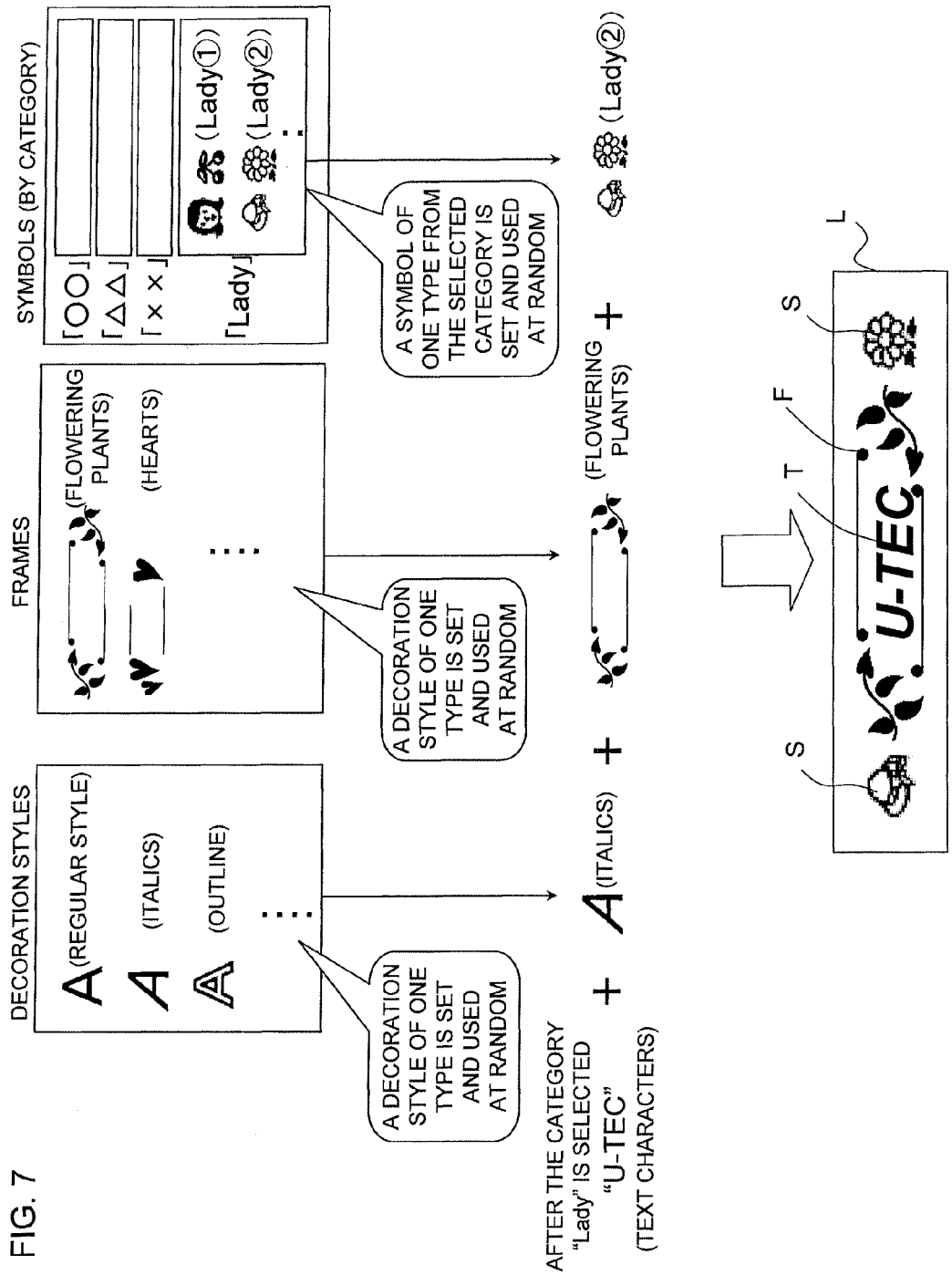
FIG. 7 is an explanatory view explaining an example of the random setting of a decoration style, frame, and symbol when producing a single print label in the second embodiment of the present disclosure.

That is, in this embodiment as well, similar to the above described first embodiment, as shown in FIG. 7, when producing the print label L that expresses the preferred text characters T intended by the operator, it is possible to set various decoration styles of the text characters T, the frame F surrounding the text characters T, and the symbol S additionally formed along with the text characters T as decorations for the text characters T.

Figure 8:
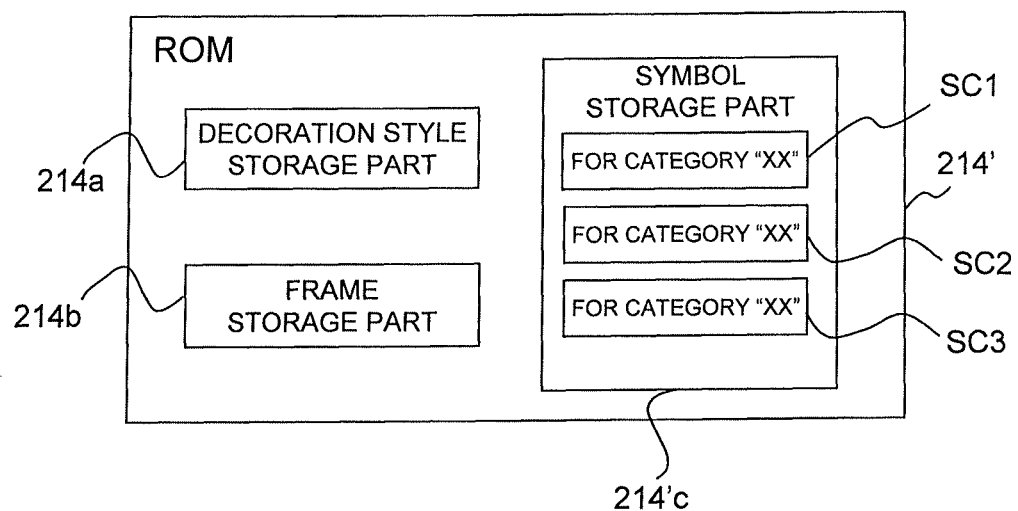
FIG. 8 is a functional block diagram of ROM.

Note, however, according to the print label producing apparatus 1 of this embodiment, a ROM 214' is provided in place of the ROM 214 of the above described first embodiment, as shown in FIG. 8. This ROM 214' is provided with a symbol storage part 214'c that separately stores the symbols S of a plurality of types according to a plurality of categories, in addition to the same decoration style storage part 214a and the frame storage part 214b as the above described first embodiment. This symbol storage part 214'c separates the symbols S of a plurality of types prepared in advance for formation along with the text characters T on the print label L according to a plurality of categories predetermined in relation to the print label L. These symbols S are stored in each of a plurality of (in this example, three) category storage parts SC1, SC2, SC3, . . . .

Returning to FIG. 7, the operator, for example, first presses the dresser key 4A twice (thereby transitioning to a category selection state), and then selects the category "Lady" by performing a suitable operation on the keyboard 3. Subsequently, the operator, similar to the above, inputs the text characters T "U-TEC" using the keyboard 3. Then, first, similar to the above described first embodiment, a decoration style of one or more types (one type in this example) is set at random from the decoration styles of a plurality of types stored in the decoration style storage part 214a. In the example of FIG. 7, similar to the above described first embodiment, from the prepared "Regular style," "Italics style," "Outline style," and other types, the "Italics style" is set. Further, from the frames F of a plurality of types stored in the frame storage part 214b, the frame F of one type is set at random. In the example of FIG. 7, similar to the above described first embodiment, from the prepared "Flowering plants," "Hearts" and other types, the frame F of the "Flowering plants" is set.

Then, the symbol S of one type is set at random from the symbols S of a plurality of types stored in the "Lady" category storage part of the symbol storage part 214c corresponding to the above described selected "Lady" category. In the example of FIG. 7, from the prepared "Lady (1)" made of the face of a young lady and berries, "Lady (2)" made of a hat and flower, and other types, the symbol S of the "Lady (2)" is set.

Then, the text characters T of the set decoration style, the frame F of the set type, and the symbols S of the set type (that is, two) are used to generate the print data (second print data; refer to step S60 of FIG. 9 described later), and the corresponding print label L is produced accordingly. In the example of FIG. 9, the print label L with the frame F of the above described flowering plants surrounding the outer periphery of the text "U-TEC" at the center, and the symbols S and S of the hat and flower disposed on both the left and right ends of the frame F of the flower plants is produced.

Control Procedure

Figure 9:
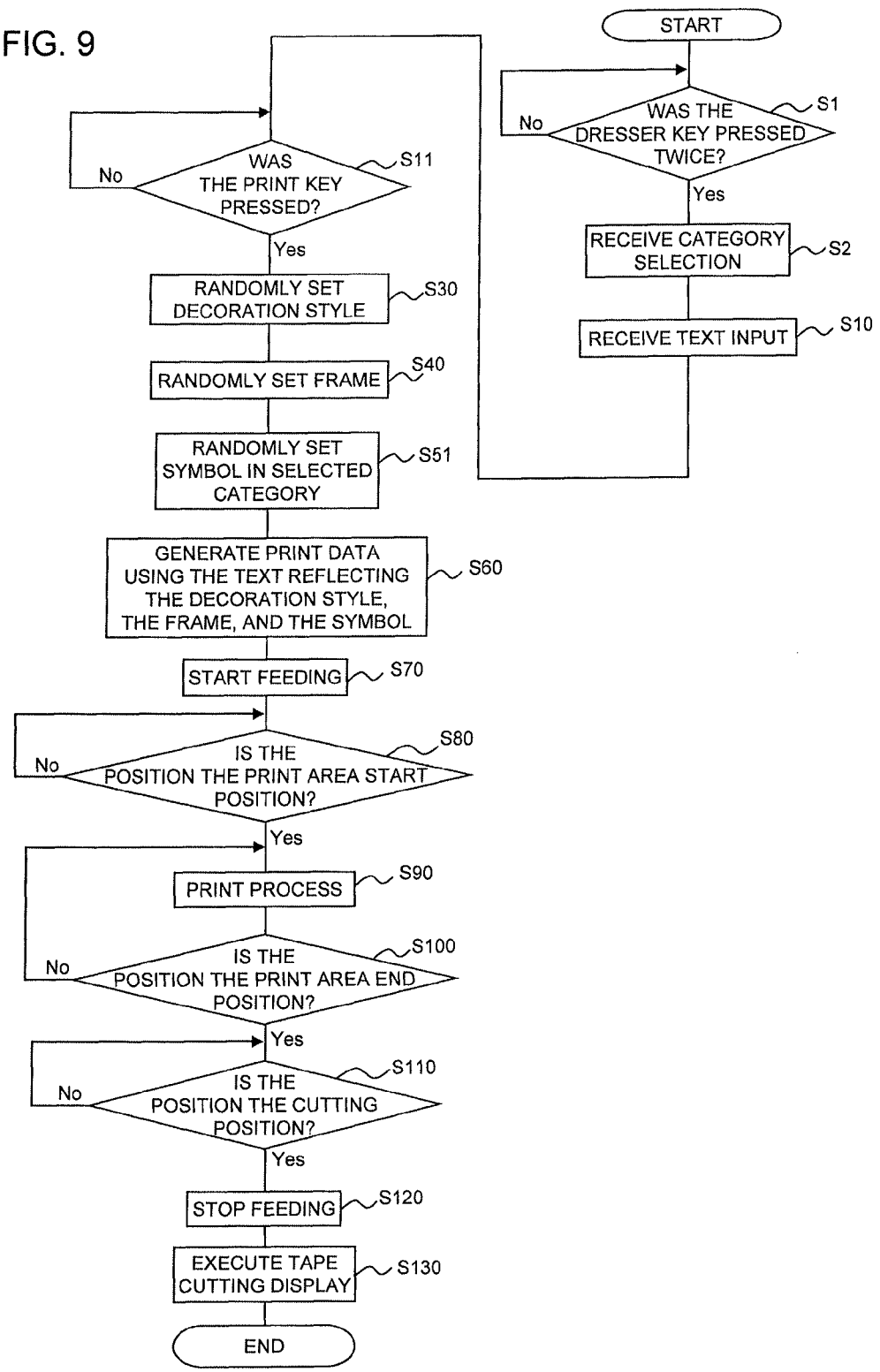
FIG. 9 is a flowchart showing a control procedure executed by the CPU.

FIG. 9 shows the processing procedure executed by the CPU 212 in order to achieve the technique of this embodiment described above.

In the flow shown in FIG. 9, the steps S1 and S2 are newly provided before the step S10 of the flow of the above described FIG. 6, step S11 is provided in place of step S20, and step S51 is provided in place of step S50.

That is, first, in step S1, the CPU 212 determines whether or not the dresser key 4A was pressed twice. As previously described, according to this embodiment, pressing this dresser key twice changes the mode to one of receiving a category selection of step S2 described later. If the dresser key 4A is not pressed twice, the decision is made that the condition of step S1 is not satisfied (S1: No), and the flow loops and enters a standby state until the condition of step S1 is satisfied. Once the dresser key 4A is pressed twice, the decision is made that the condition of step S1 is satisfied (S1: Yes), and the flow proceeds to step S2.

In step S2, the CPU 212 receives the above described category selection (selection of the category "Lady" in the above described example) via a suitable operation on the keyboard 3 by the operator. Subsequently, the CPU 212 receives input of the text characters T in step S10, similar to the above described first embodiment. Note that, unlike the flow of the above described steps S1, S2, and S10, the above described category selection may be received by first receiving the input of the text characters T using the keyboard 3 and then transitioning to a mode for receiving the category selection via the holding down of the dresser key 4A by the operator. Furthermore, in place of selection of one category by the operator as described above, one specific category may be automatically associated according to a specific correlation set in advance from the text characters T input using the keyboard 3.

The flow then passes through the same step S10 as that of the above described first embodiment, and proceeds to the newly provided step S11. In step S11, the CPU 212 determines whether or not the print key 4C was pressed. If the print key 4C has not been pressed, the decision is made that the condition of step S11 is not satisfied (S11: No), and the flow loops and enters a standby state until the condition of step S11 is satisfied. Once the print key 4C is pressed, the decision is made that the condition of step S11 is satisfied (S11: Yes), and the flow proceeds to step S30.

The random setting of the decoration style of step S30 and the random setting of the frame of step S40 are the same as those of the above described first embodiment. Subsequently, the flow proceeds to the newly provided step S51.

In step S51, the CPU 212 sets at random the symbol S of one type from the plurality of types stored in the category storage part (the "Lady" category storage part corresponding to the category "Lady" in the example of FIG. 7) corresponding to the category selected by the operator that was received in step S2, as the symbol to be disposed on both the left and right sides of the frame F set in the above described step S40. Subsequently, the flow proceeds to step S60, similar to the above.

In step S60, similar to the above described first embodiment, the CPU 212 produces the print data using the text characters T reflecting the decoration style set in the above described step S30, the frame F set in the above described step S40, and the symbol S set in the above described step S51. Note that, similar to the above, generation of the print data is not always limited to use of all three described above, allowing generation using at least one of the text characters T reflecting the decoration style set in the above described step S30, the frame F set in the above described step S40, and the symbol S set in the above described step S51.

The subsequent steps S70-S130 are the same as those of the flow of FIG. 6, and detailed description thereof will be omitted.

In this embodiment as well, the operator can quickly and easily produce the print label L decorated with the decoration style of the text characters T, the frame F, and the symbol S similar to the above described first embodiment, by simply performing the input operation of the text characters T using the keyboard 3 and the production start instruction operation using the print key 4C (or by further simply adding a suitable category selection operation). Accordingly, similar to the above described first embodiment, a novice user can enjoy decorating the print label L, making it possible to spark the interest of the novice user in the adding of decorations.

Third Embodiment

Next, a third embodiment of the present disclosure will be described with reference to FIGS. 10-12. Components identical to those in the first and second embodiments are denoted using the same reference numerals, and descriptions thereof are omitted or simplified as appropriate. According to this embodiment, a plurality of combinations of a decoration style, frame, and symbol is set and used.

Figure 10:
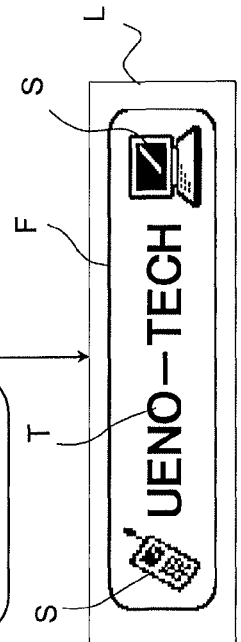
FIG. 10 is an explanatory view explaining an example of the random setting of a combination of a decoration style, frame, and symbol when producing a single print label in the third embodiment of the present disclosure.

That is, in this embodiment, as shown in FIG. 10, a plurality of combinations of the above described decoration style, frame F, and symbol S is prepared in advance, and one of the plurality of combinations is automatically set as the decoration for the text characters T when producing the print label L that expresses the preferred text characters T intended by the operator. The combinations are respectively associated with a plurality of categories set in advance.

Figure 11:
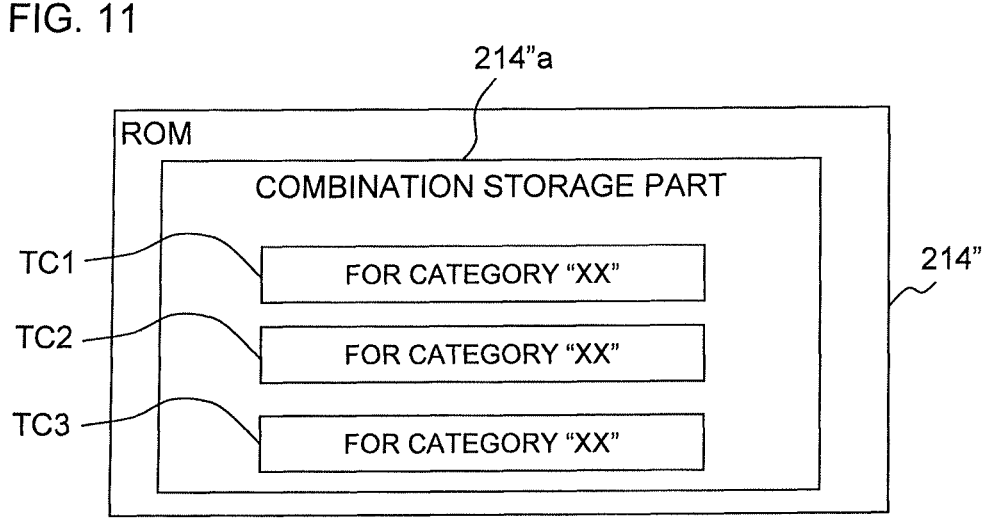
FIG. 11 is a functional block diagram of ROM.

That is, according to the print label producing apparatus 1 of this embodiment, a ROM 214" is provided in place of the ROM 214 of the above described first embodiment, as shown in FIG. 11. A combination storage part 214" a is provided to this ROM 214". This combination storage part 214"a separates and stores combinations made of the decoration style of a specific type, the frame F of one specific type, and the symbols S and S of two specific types prepared in advance as previously described, according to the above described plurality of categories predetermined in relation to the print label L. These combinations are respectively stored in a plurality (three in this example) of category combination storage parts TC1, TC2, TC3, . . . .

Returning to FIG. 10, the operator first selects the category "Office" by a suitable operation on the keyboard 3, for example. Subsequently, the operator, similar to the above, inputs the text characters T "UENO-TEC" using the keyboard 3. Then, of the category combination storage parts TC1, TC2, TC3, . . . of the above described combination storage part 214"a, the combination of the specific above described decoration style, frame F, and symbols S stored in the "Office" category combination storage part corresponding to the above described selected category "Office" is selected and automatically set.

In the example of FIG. 10, the category combination storage part TC1 corresponding to the "Food" category stores the combination of a regular decoration style, the frame F of marbles, and the symbols S made of tableware and berries, for example. Further, the category combination storage part TC2 corresponding to the category "Office" stores the combination of the bold decoration style, the corner-less frame F, and the symbols S made of a mobile phone and PC. Further, the category combination storage part TC3 corresponding to the "Sports" category stores the combination of the single-byte bold decoration style, the dot frame F, and the symbols S made of soccer gear and baseball gear. In the above example, the combination of the above described bold decoration style, corner-less frame F, and symbols S made of the mobile phone and PC corresponding to the selected category "Office" is selected, and the above described decoration style, frame F, and symbols S included in the combination are set.

Then, the text characters T of the set decoration style, the frame F of the set type, and the symbols S of the set types (that is, two) are used to generate the print data (third print data; refer to step S60 of FIG. 12 described later), and the corresponding print label L is produced accordingly. In the example of FIG. 10, the print label L surrounded by the above described corner-less frame F, with the text of "U-TEC" disposed at the center and the symbols S and S of the mobile phone and PC disposed on both the left and right ends of the text, is produced.

Control Procedure

Figure 12:
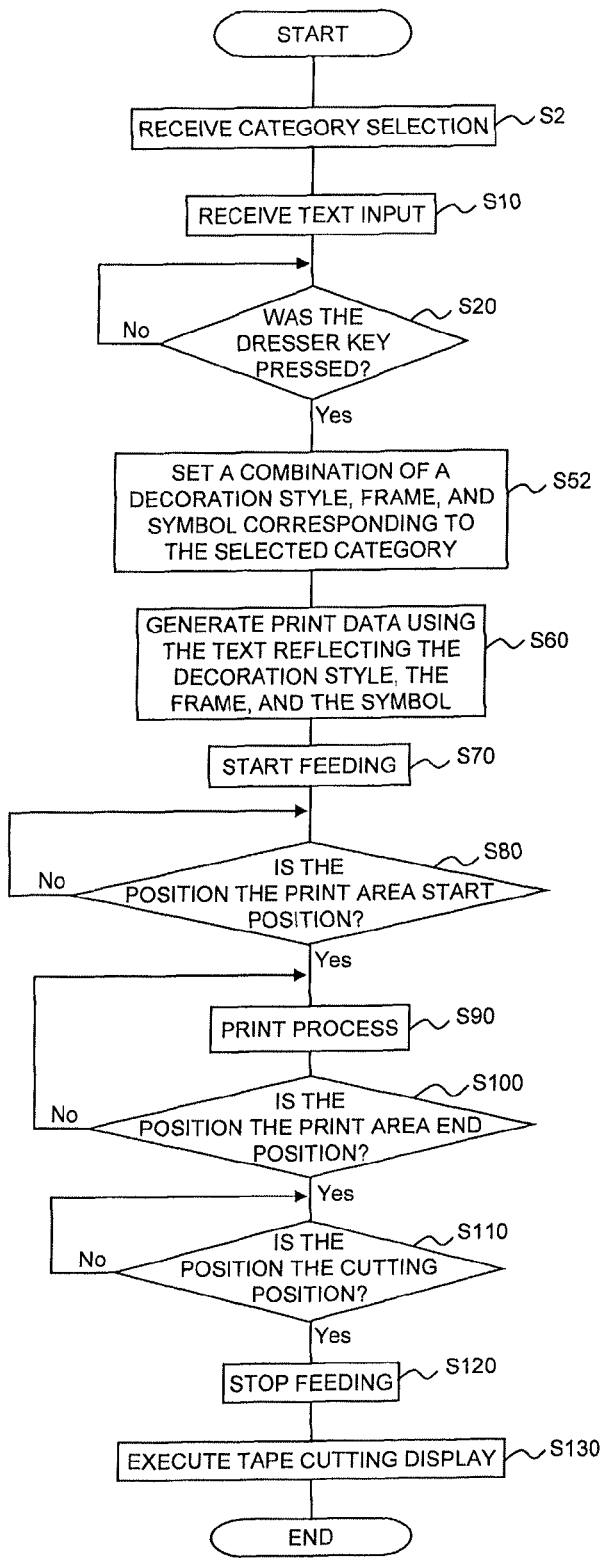
FIG. 12 is a flowchart showing a control procedure executed by the CPU.

FIG. 12 shows the processing procedure executed by the CPU 212 in order to achieve the technique of this embodiment described above.

In the flow shown in FIG. 12, the step S1 of the flow of the above described FIG. 9 is omitted. Further, the same step S20 as that in the flow of the above described FIG. 6 and a new step S52 are provided in place of the steps S11, S30, S40, and S51 between the steps S10 and S60.

First, in step S2, similar to the above described FIG. 9, the CPU 212 receives the above described category selection (selection of the category "Office" in the above described example) via a suitable operation on the keyboard 3 by the operator. Subsequently, the flow passes through the same step S10 as in the above described FIG. 6 and FIG. 9 and proceeds to step S20.

In step S20, similar to the above described FIG. 6, the CPU 212 determines whether or not a production start instruction for the print label L was issued by the pressing of the dresser key 4A. In a case where the dresser key 4A was pressed, the decision is made that the condition of step S20 is satisfied (S20: Yes), and the flow proceeds to the newly provided step S52.

Note that the above described procedure may be changed, allowing selection of the category by the pressing of the dresser key 4A of step S20 followed by reception of the input of the text characters T using the keyboard 3 of step S10. In this case, after input of the text characters T, the print key 4C is pressed. Further, in place of selection of one category by the operator as described above, one specific category may be automatically associated according to specific correlations set in advance from the text characters T input using the keyboard 3 (for example, the above described "Sports" category may be automatically selected if the text characters T include "baseball," etc.).

In step S52, the CPU 212 selects and sets a combination stored in the category combination storage part of the combination storage part 214"a of the ROM 214 that corresponds to the category selected by the operator and received in the above described step S2 (the category storage part corresponding to the category "Office" in the example of FIG. 10). Subsequently, the flow proceeds to step S60, similar to the above.

In step S60, similar to the above described first and second embodiments, the CPU 212 produces print data using the text characters T reflecting the decoration style, the frame F, and the symbols S set by the combination in the above described step S51.

The subsequent steps S70-S130 are the same as those of the flow of FIG. 6 and FIG. 9, and detailed description thereof will be omitted.

In this embodiment as well, the operator can quickly and easily produce the print label L decorated with the decoration style of the text characters T, the frame F, and the symbol S similar to the above described first and second embodiments, by simply performing the category selection operation, the input operation of the text characters T using the keyboard 3, and the production start instruction operation using the dresser key 4A. Accordingly, similar to the above described first and second embodiments, even a novice user can enjoy decorating the print label L, making it possible to spark the interest of the novice user in the adding of decorations.

Fourth Embodiment

Next, a fourth embodiment of the present disclosure will be described with reference to FIG. 13 and FIG. 14. Note that components identical to those in each of the above described embodiments are denoted using the same reference numerals, and descriptions thereof will be omitted or simplified as appropriate. This embodiment is for subsequently reproducing the decoration style, the frame F, and the symbol S applied to the print label L in the above described first to third embodiments. That is, a different print label (hereinafter suitable called "guidance label") GL that forms into print the operation method for setting the decoration style, frame F, and symbol S by a manual operation by the operator via the above described function key group 4 is produced.

The following describes a case of the production of the guidance label GL for reproducing the print label L produced in the above described first embodiment as an example. In this case, as shown in FIG. 13, after the print label L of the above described first embodiment is produced as previously described, the guidance label GL is produced, forming the operation method for setting the decoration style ("Italics" in this example), the frame F ("Flowering plants" in this example), and the symbol S ("Animals" in this example) applied to the print label L by manual operation as a guidance print R. Note that, prior to transitioning to production of the guidance label GL, the confirmation message, "Do you want to produce the guidance label?" is displayed as shown in the figure to verify the intention of the operator.

In this example, as shown in FIG. 13, the operation method '(1) Operate the "Frame" key and select "No. 4"' for setting the frame F of the above described flowering plants by a manual operation is first formed into print on the guidance label GL. Further, the operation method '(2) Operate the "Decoration style" key and select "Italics"' for setting italics as the above described decoration style by a manual operation is formed into print. Furthermore, the operation method '(3) Operate the "Symbol" key, select "Animals," and input "A1"' for setting the symbol S of the above described face of a cat by a manual operation is formed into print. Then, the operation method '(4) Operate the "Symbol" key, select "Animals," and input "A2"' for setting the symbol S of the above described face of a dog by a manual operation is formed into print.

Control Procedure

Figure 14:
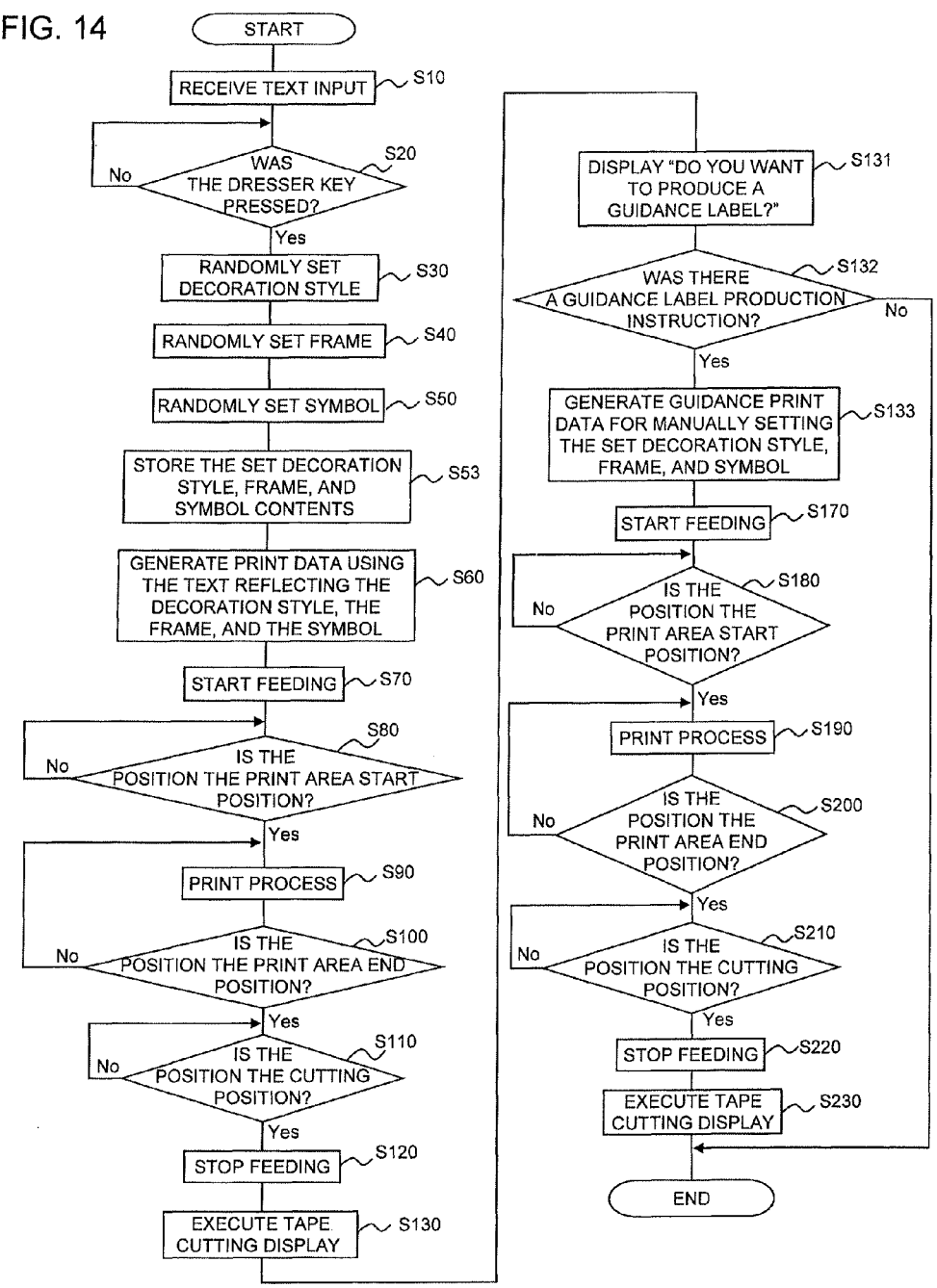
FIG. 14 is a flowchart showing a control procedure executed by the CPU.

FIG. 14 shows the processing procedure executed by the CPU 212 in order to achieve the technique of this embodiment.

In this embodiment, step S53 is newly provided between step S50 and step S60 of the flow of the above described FIG. 6. Further, after step S130, steps S131, S132, and S133 are newly provided.

In FIG. 14, after the same steps S10-S50 as those in the above described FIG. 6 are performed, the flow proceeds to the newly provided step S53. In step S53, the CPU 212 stores the contents of the decoration style, the frame F, and the symbol S respectively set in steps S30, S40, and S50 in the RAM 213 (refer to FIG. 4).

Subsequently, the same steps S60-S130 as those in the above described FIG. 6 are executed, the above described print label L that reflects the decoration style, the frame F, and the symbol S respectively set in the steps S30, S40, and S50 is produced, and the flow proceeds to the newly provided step S131.

In step S131, the CPU 212 outputs a display signal to the liquid crystal display 5 and displays the confirmation message, "Do you want to produce the guidance label?" (refer to FIG. 13) on the liquid crystal display 5.

Subsequently, in step S132, the CPU 212 determines whether or not there was a production instruction for the guidance label GL by the operator via a suitable operation on the keyboard 3. If there was not a production instruction for the guidance label GL, the decision is made that the condition of step S132 is not satisfied (S132: No), and this process terminates. If there is a production instruction for the guidance label GL, the decision is made that the condition of step S132 is satisfied (S132: Yes), and the flow proceeds to step S133.

In step S133, the CPU 212 generates guidance print data for forming the above described guidance print R that sets the decoration setting contents (the decoration style set in step S30, the frame F set in step S40, and the symbol S set in step S50) of the print label L stored in step S53 by a manual operation.

Note that the subsequent steps S170, S180, S190, S200, S210, S220, and S230 have the same contents as the above described steps S70, S80, S90, S100, S110, S120, and S130, respectively. In step S190, the print corresponding to the above described guidance print data is formed.

Note that, while the above describes a case of the production of the guidance label GL for reproducing the print label L produced in the first embodiment as an example, the same holds true for a case where the print label L of the second or third embodiment is to be reproduced.

According to this embodiment, after the print label L is produced using techniques such as those of the first to third embodiments previously described, it is possible for the operator to reliably recognize the decoration style, the frame F, and the symbol S used to produce that print label L and how to set these via a manual operation by producing the above described guidance label GL. As a result, the operator can easily reproduce the print label L which is of the same print form by performing the manual operation using the keyboard 3, etc., thereby making it possible to further improve convenience.

Note that the arrow shown in each figure, such as FIG. 4, in the above denotes an example of signal flow, but the signal flow direction is not limited thereto.

Also note that the present disclosure is not limited to the procedures illustrated in the flowcharts of FIG. 6, FIG. 9, FIG. 12, FIG. 14, etc., and additions and deletions as well as sequence changes to the procedure may be made without deviating from the spirit and scope of the disclosure.

Further, other than that already stated above, techniques based on the above described embodiments and each of the modifications may be suitably utilized in combination as well.

What is claimed is:

1. A print label producing apparatus comprising:
a feeder configured to feed a print-receiving medium;
a printing head configured to form print on said print-receiving medium fed by said feeder;
a first operating device configured to input for an operation text characters to be printed on a print label produced by use of said print-receiving medium;
a second operating device configured to issue a production start instruction for said print label;
a memory; and
a controller,
said memory including:
a first sub memory configured to store decoration styles of a plurality of types prepared in advance for application to said text characters to be formed on said print label;
a second sub memory configured to store frames of a plurality of types prepared in advance for surrounding said text characters on said print label; and
a third sub memory configured to store symbols of a plurality of types prepared in advance for formation along with said text characters on said print label, said symbols being classified according to a plurality of categories predetermined in relation to said print label, and
said controller being configured to execute:
a decoration setting process to perform at least one of a first sub decoration setting process for setting a decoration style of one or more types randomly among said decoration styles of a plurality of types stored in said first sub memory, a second sub decoration setting process for setting a frame of one type randomly among said frames of a plurality of types stored in said second sub memory, and a third sub decoration setting process for setting a symbol of one type randomly among symbols of a plurality of types stored in said third sub memory, the symbols being corresponding to the one category specified from said plurality of categories based on said text characters input via said first operating device;
a first print data generating process for generating first print data, by means of including at least one or more results of said decoration setting process of any of said decoration style of one or more types randomly set by said first sub decoration setting process, said frame of one type randomly set by said second sub decoration setting process, or said symbol of one type randomly set by said third sub decoration setting process, in a case that said second operating device is operated; and
a first coordination control process for controlling said feeder and said printing head in coordination and for producing said print label with formed print corresponding to said first print data, wherein:
said controller is configured to further execute:
a second coordination control process for controlling said feeder and said printing head in coordination and, after said print label is produced based on the control of said first coordination control process, and for producing a different print label on which an operation method for different print label on which an operation method for setting the decoration style, frame, and symbol applied to the produced print label by a manual operation is printed.

2. The print label producing apparatus according to claim 1, further comprising a third operating device for inputting for selection one category of a plurality of categories predetermined in relation to said print label, wherein:
said decoration setting process includes at least one process of said first sub decoration setting process where a decoration style of one or more types is randomly set among said decoration styles of the plurality of types stored in said first sub memory, said second sub decoration setting process where a frame of one type is randomly set among said frames of the plurality of types stored in said second sub memory, and said third sub decoration setting process where a symbol of one type is randomly set among symbols of the plurality of types stored in said third sub memory, the symbols being corresponding to the one category selected from said plurality of categories via said third operating device.

3. A print label producing apparatus comprising:
a feeder configured to feed a print-receiving medium;
a printing head configured to form print on said print-receiving medium fed by said feeder;

a first operating device configured to input for an operation text characters to be printed on a print label produced by use of said print-receiving medium;
a second operating device configured to issue a production start instruction for said print label;
a memory; and
a controller,
said memory including:
a first sub memory configured to store decoration styles of a plurality of types prepared in advance for application to said text characters to be formed on said print label;
a second sub memory configured to store frames of a plurality of types prepared in advance for surrounding said text characters on said print label; and
a fourth sub memory configured to store symbols of a plurality of types prepared in advance for formation along with said text characters on said print label, and
said controller being configured to execute:
a decoration setting process to perform at least one of a first sub decoration setting process for setting a decoration style of one or more types randomly among said decoration styles of a plurality of types stored in said first sub memory, a second sub decoration setting process for setting a frame of one type randomly among said frames of a plurality of types stored in said second sub memory, and a fourth sub decoration setting process for setting a symbol of one type randomly among said symbols of a plurality of types stored in said fourth sub memory;
a second print data generating process for generating second print data, by means of including at least one or more results of said decoration setting process of any of said decoration style of one or more types randomly set by said first sub decoration setting process, said frame of one type randomly set by said second sub decoration setting process, or said symbol of one type randomly set by said fourth sub decoration setting process, in case that said second operating device is operated; and
a third coordination control process for controlling said feeder and said printing head in coordination and for producing said print label with formed print corresponding to said second print data, wherein:
said controller is configured to further execute:
a fourth coordination control process for controlling said feeder and said printing head in coordination and, after said print label is produced based on the control of said third coordination control process, and for producing a different print label on which an operation method for setting the decoration style, frame, and symbol applied to the produced print label by a manual operation is printed.

4. A print label producing apparatus comprising:
a feeder configured to feed a print-receiving medium;
a printing head configured to form print on said print-receiving medium fed by said feeder;
a first operating device configured to input for an operation text characters to be printed on a print label produced by use of said print-receiving medium;
a second operating device configured to issue a production start instruction for said print label;
a third operating device for inputting for selection one category of a plurality of categories predetermined in relation to said print label;
a memory configured to store a plurality of combinations made of a specific decoration style prepared in advance for application to said text characters to be formed on said print label, a specific frame of one type prepared in advance for surrounding said text characters on said print label, and a specific symbol of one type prepared in advance for formation along with said text characters on said print label, respectively and individually associated with said plurality of categories; and
a controller, and
said controller being configured to execute:
a decoration setting process for setting one combination corresponding to one said category selected by said third operating device among said plurality of combinations stored in said memory;
a third print data generating process for combining said specific decoration style, said specific frame of one type, and said specific symbol of one type, in accordance with one combination set by said decoration setting process, and generating third print data, in case that said second operating device is operated; and
a fifth coordination control process for controlling said feeder and said printing head in coordination and for producing said print label with formed print corresponding to said third print data, wherein:
said controller is configured to further execute:
a sixth coordination control process for controlling said feeder and said printing head in coordination and, after said print label is produced based on the control of said fifth coordination control process, and for producing a different print label on which an operation method for setting the decoration style, frame, and symbol applied to the produced print label by a manual operation is printed.

* * * * *